United States Patent [19]
Bannister et al.

[11] Patent Number: 5,943,399
[45] Date of Patent: Aug. 24, 1999

[54] METHODS AND APPARATUS FOR PROVIDING COMMUNICATIONS TO TELECOMMUNICATIONS TERMINALS

[75] Inventors: Cecil H. Bannister, Colorado Springs, Colo.; Rangaprasad Govindarajan; Russell A. Edwards, both of Dallas, Tex.; Bradley A. Fink, Allen, Tex.

[73] Assignee: Northern Telecom Limited, Montreal, Canada

[21] Appl. No.: 08/718,746

[22] Filed: Sep. 25, 1996

Related U.S. Application Data

[60] Provisional application No. 60/004,604, Sep. 29, 1995.

[51] Int. Cl.$^6$ .............................. H04M 1/57; H04M 1/65; H04M 3/50
[52] U.S. Cl. .................................... 379/88.17; 379/88.18; 455/414; 455/466; 370/493
[58] Field of Search ...................................... 455/412, 413, 455/414, 560, 466; 379/88.17, 88.18, 88.25, 142, 196, 201, 211; 370/493, 494, 495, 522

[56] References Cited

U.S. PATENT DOCUMENTS

| | | | |
|---|---|---|---|
| 5,097,528 | 3/1992 | Gursahaney et al. | 379/88.17 |
| 5,329,578 | 7/1994 | Brennan et al. | 379/88.19 |
| 5,351,276 | 9/1994 | Doll, Jr. et al. | 379/88.17 |
| 5,530,740 | 6/1996 | Irribarren et al. | 379/88.17 |
| 5,557,659 | 9/1996 | Hyde-Thomson | 379/88.17 |
| 5,646,981 | 7/1997 | Klein | 379/88.17 |
| 5,717,742 | 2/1998 | Hyde-thomson | 379/88.17 |

FOREIGN PATENT DOCUMENTS

0 631 452 A1  12/1994  European Pat. Off. .

*Primary Examiner*—Willis R. Wolfe
*Attorney, Agent, or Firm*—Foley & Lardner

[57] ABSTRACT

In methods and apparatus for providing communications to a telecommunications terminal, a request for a page of data is received at a data service node, the request specifying at least one particular terminal. A terminal status request is sent from the data service node to a communications system which serves the particular terminal, the terminal status request specifying the particular terminal. The data service node receives from the communications system a terminal status message containing information indicating a current status of the particular terminal. The data service node sends to the data terminal a page of data indicating the current status of the particular terminal. The page of data comprises a communications request icon when the particular terminal is in a state in which it can communications. Upon selection of the communications request icon at the data terminal, the data service node receives a communications request specifying another telecommunications terminal, and sends to the communications system a communications origination request to originate communications between the particular terminal and the other terminal. The particular terminal may be a mobile voice terminal having a display and being served by a wireless communications system. The page of data may include both a voice call request icon for initiating a voice call to the particular terminal, and a short message request icon for sending a short message to be displayed at the particular terminal.

18 Claims, 9 Drawing Sheets

METHODS AND APPARATUS FOR PROVIDING COMMUNICATIONS TO TELECOMMUNICATIONS TERMINALS

This application claims benefit of Provisional Appln. No. 60/004,604 Sep. 29, 1995.

FIELD OF INVENTION

This invention relates to methods and apparatus for providing communications to telecommunications terminals. Disclosed embodiments of the invention are particularly applicable to providing communications to mobile voice terminals having displays for displaying alphanumeric information.

BACKGROUND OF INVENTION

Today many wireless telecommunications technologies, for example, the Global System for Mobile communications (GSM), offer a Short Message Service (SMS) which enables a caller to deliver a short text message to a mobile terminal for display at the mobile terminal.

Callers wishing to send short messages to mobile terminals can call an Interactive Voice Response (IVR) system and respond to a voice menu to select from among a limited number of predefined short messages. This system is cumbersome to use and offers only a limited range of short messages to the caller. Moreover, the caller receives no reply from the called party except, in some cases, an acknowledgement that the short message has been received.

Alternatively, callers wishing to send short messages to mobile terminals may place a voice call to a human operator and speak the desired message to the operator. The operator types the spoken message as text on a data terminal, and the short message subsystem delivers the typed message to the mobile terminal for display. Unfortutately, this process is error-prone and lacks privacy. Moreover, the called party cannot return a short message to the calling party.

Alternatively, callers wishing to send short messages to mobile terminals may use workstations running software applications specifically designed to interact with the short message subsystems. This approach offers flexibility in message content and privacy to the caller, but requires that the caller have access to a workstation running the required software application. As workstations running such software applications are few and far between, the caller may not have access to such a workstation when and where he wants to send a short message.

Moreover, callers generally prefer voice service to short message service and want to use short message service only when a voice connection cannot be established. The existing short message services do not enable the caller to determine whether a voice call can be achieved instead of sending a short text message.

SUMMARY OF INVENTION

An object of this invention is to reduce or avoid some or all of the disadvantages of the known short message services as outlined above.

One aspect of this invention provides a method for providing communications to a telecommunications terminal. According to the method, a request for a page of data is received at a data service node, the request specifying at least one particular telecommunications terminal. A terminal status request is sent from the data service node to a communications system which serves the particular telecommunications terminal, the terminal status request specifying the particular telecommunications terminal. The data service node receives from the communications system a terminal status message containing information indicating a current status of the particular telecommunications terminal. The data service node sends to the data terminal a page of data indicating the current status of the particular telecommunications terminal. The page of data comprises at least one communications request icon when the particular telecommunications terminal is in a state in which it can receive communications. Upon selection of the communications request icon at the data terminal, the data service node receives a communications request specifying another telecommunications terminal, and sends to the communications system a communications origination request to originate communications the particular telecommunications terminal and the other telecommunications terminal.

The method according to one aspect of the invention enables the caller to determine the status of the particular terminal before attempting to communicate with that terminal.

The particular telecommunications terminal may be a mobile voice terminal having a display for displaying alphanumeric information, and the communications system may be a wireless communications system. In this case, the page of data may comprise a voice call request icon when the particular telecommunications terminal is in a state in which it can receive a voice call, and may also comprise a short message request icon, the short message request icon comprising a data entry field for entry of a text message. Upon selection of the voice call request icon at the data terminal, the data service node receives a voice call request comprising a voice terminal identifier and sends from the data service node to the communications system a voice call origination request to originate a voice call between a voice terminal specified by the voice terminal identifier and the particular telecommunications terminal. Upon selection of the short message request icon at the data terminal, the data service node receives a short message request comprising a short message and sends from the data service node to the communications system a short text message for delivery to and display at the particular telecommunications terminal.

In this case, the invention enables the caller to determine the status of the mobile voice terminal attempting to place a call to that terminal. Consequently, the caller can decide whether to place a voice call to the mobile terminal or to send a short message to the mobile terminal based on the current status of the mobile terminal.

The short message request icon may further comprise a plurality of numbered menu item data entry fields for entry of short message reply alternatives. In this case, the short message request further comprises any text entered into the numbered menu item data entry fields. The data service node sends to the wireless communications system any text entered in the numbered menu item data entry fields for display on the particular mobile voice terminal as numbered menu items. The data service node receives from the wireless communications system a short message response comprising a dialled digit corresponding to one of the numbered menu items. The data service node sends another page of data to the data terminal, the other page of data specifying the numbered menu item corresponding to the dialled digit.

The user-defined menu items incorporated in the short messages permit meaningful short message replies with minimal use of reverse radio channels, minimal consumption of wireless communications system resources and minimal enhancements to the wireless communications system.

Another aspect of this invention provides a data service node comprising a processor and a memory storing instructions for execution by the processor. The processor is operable according to the stored instructions to perform the methods as defined above.

BRIEF DESCRIPTION OF DRAWINGS

Embodiments of the invention are described below by way of example only. Reference is made to accompanying drawings in which.

DETAILED DESCRIPTION

Figure 1:
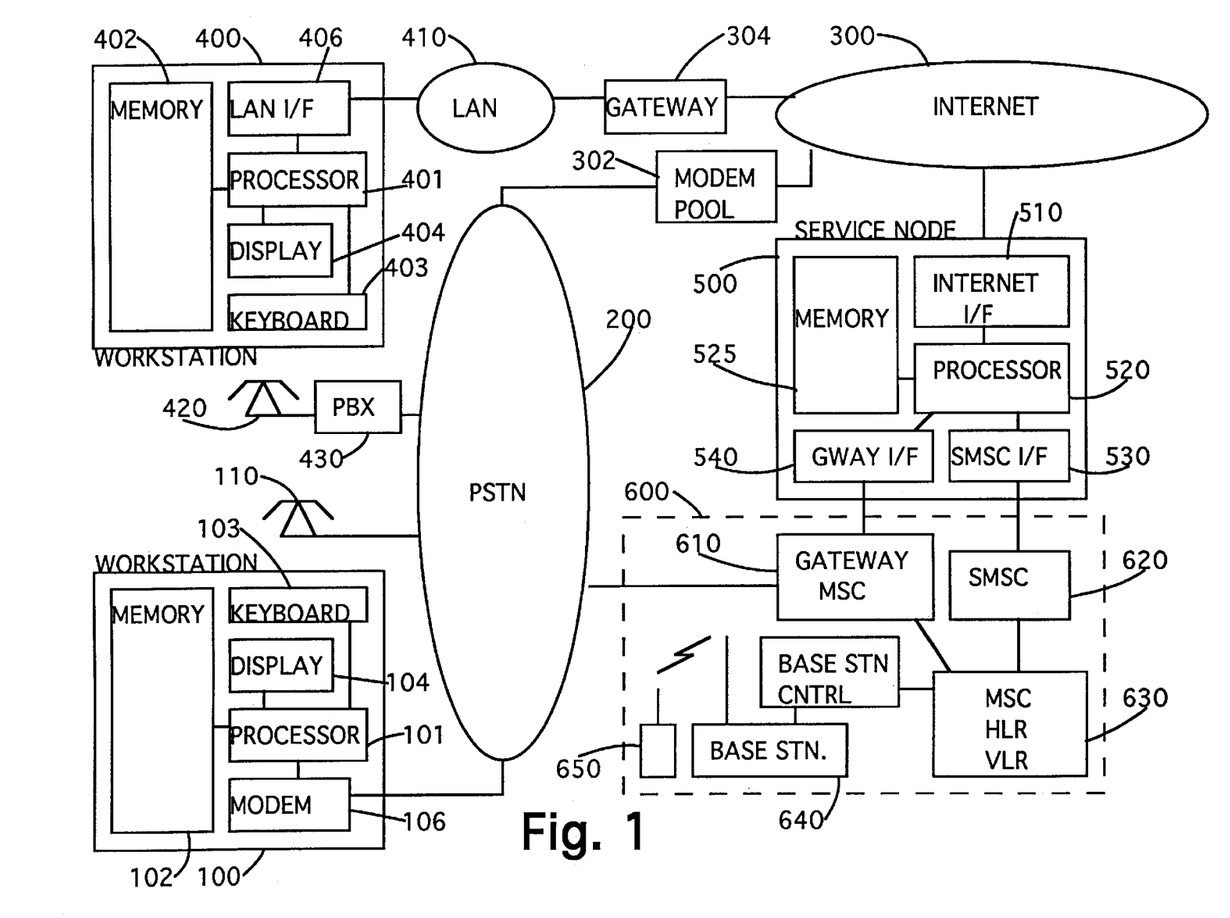
FIG. 1 is a block schematic diagram of interconnected telecommunications networks providing a short message service to mobile terminals according to an embodiment of the invention.

FIG. 1 is a block schematic diagram showing interconnected telecommunications networks incorporating an embodiment of the invention.

A data terminal in the form of a first workstation 100 comprises a processor 101, a memory 102 storing instructions for execution by the processor 101, a keyboard 103 for providing manual inputs to the processor 101 and a display 104 for displaying data to an operator of the workstation 100. The workstation 100 further comprises a modem 106 for formatting data for transmission over the Public Switched Telephone Network (PSTN) 200.

A voice terminal in the form of a telephone 110 is located near the workstation 100 and is intended for the use of the operator of the workstation 100. The telephone 110 is also connected to the PSTN 200.

For example, the workstation 100 and the telephone 110 may be located in the operator's home. The operator may use the workstation 100 to obtain access to a data network in the form of the Internet 300 via the PSTN 200. A modem pool 302 links the PSTN 200 to the Internet 300 for this purpose. The memory 102 of the workstation 100 contains "browser software" (for example Netscape™), which the operator may use to "navigate" among various data services provided via the Internet 300.

Another data terminal in the form of a second workstation 400 comprises a processor 401, a memory 402 storing instructions for execution by the processor 401, a keyboard 403 for providing manual inputs to the processor 401 and a display 404 for displaying data to an operator of the workstation 400. The workstation 400 further comprises a LAN interface 406 for formatting data for transmission over a Local Area Network 410.

A voice terminal in the form of a telephone 420 is located near the workstation 400 and is intended for the use of the operator of the workstation 400. The telephone 420 is connected to the PSTN 200 via a Private Branch Exchange (PBX) 430.

For example, the workstation 400, the LAN 410, the telephone 420 and the PBX 430 may be located at the operator's place of business. The operator may use the workstation 400 to obtain access to a data network in the form of the Internet 300 via the LAN 410. An Internet gateway 304 links the LAN 410 to the Internet 300 for this purpose. The memory 402 of the workstation 400 contains "browser software" (for example Netscape™), which the operator may use to "navigate" among various data services provided via the Internet 300.

A data service node 500 is connected to the Internet 300 to provide data services. The data service node 500 comprises an Internet interface 510, a processor 520, and a memory 525. The memory 525 stores instructions to be executed by the processor 520 and data to be used by the processor 520 in executing those instructions. In particular, the memory 525 contains HyperText Transfer Protocol (HTTP) server software. The HTTP software enables the data service node 500 to forward World Wide Web pages of data to the workstations 100, 400 over the Internet 300 upon receipt of messages from the workstations 100, 400 requesting those pages of data.

As is conventional in the operation of the World Wide Web, the data service node forwards HyperText Markup Language (HTML) instructions to the workstation 100 together with the data required for display of the pages of data. The HTML instructions are stored in the memory 102 and are executed by the workstation 100 when command icons displayed on the pages of data are selected by the operator of the workstation 100 to send a message to the data service node 500, and the data service node 500 responds to the message to execute the command corresponding to the icon. Some of the command icons may include data entry fields and textual instructions for filling of the data entry fields by the operator of the workstation 100. When such command icons are selected at the workstation 100, downloaded HTML instructions are executed at the workstation 100 to send a message incorporating the content of the data entry field to the data service node 500. The command icons may simply be selectable lines of text, or may comprise selectable pictorial elements.

Further HTTP software is stored in the memory 525 of the data service node 500 to enable the data service node 500 to receive messages from the workstation 100 and to execute commands corresponding to those messages. The memory 525 may store additional software applications which may be executed in response to receipt of particular messages by the HTTP software.

According to an embodiment of the invention, the data service node further comprises a SMSC interface 530 for communication with a Short Message Service Center (SMSC) 620 of a GSM wireless system 600 and a Gateway interface 540 for communication with a Gateway Mobile Switching Center (MSC) 610 of the GSM system 600. The GSM system 600 further comprises at least one Mobile Switching Center/Home Location Register/Visitor Location Register (MSC/HLR/VLR) 630 which is connected to the Gateway MSC 610 and the SMSC 620, at least one base station 640 which is connected to the MSC/HLR/VLR 630, and at least one mobile terminal 650 which can be connected to the base station 640 via a radio channel. The mobile terminal 650 has a display for display of short text messages. The Gateway MSC is connected to the PSTN 200 to provide voice channel connections between terminals connected to the PSTN and mobile terminals of the GSM system 600.

Figure 2:
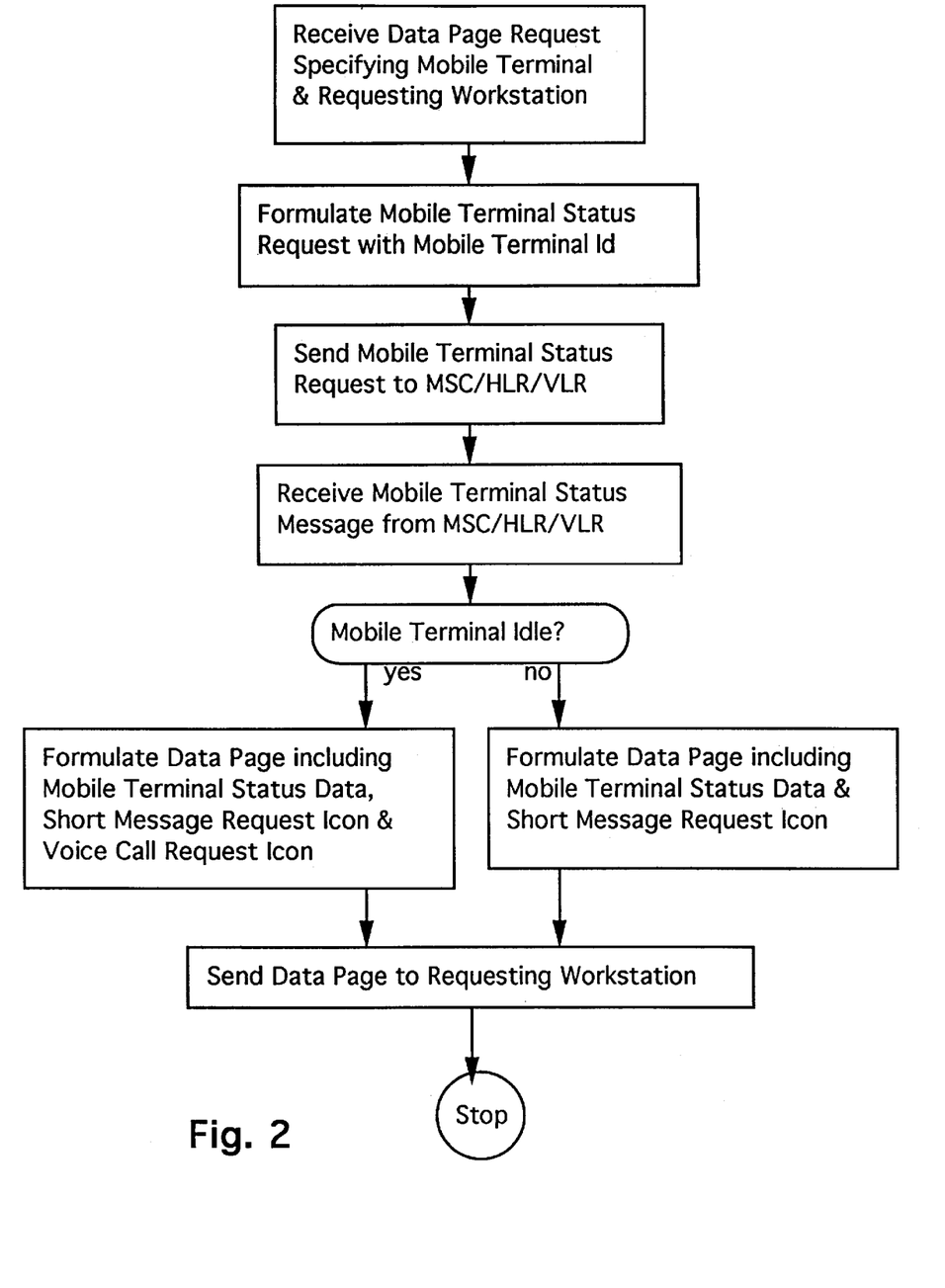
FIG. 2 is a flow chart showing steps executed by a data service node of the interconnected networks of FIG. 1 in response to a request for a page of data.

According to the embodiment of the invention, the memory 525 of the data service node 500 contains HTTP software which enables the data service node 500 to receive a request for a page of data from a workstation (for example the workstation 100) via the Internet 300. The memory 525 contains a software application triggered by the HTTP software which enables the data service node 500 to request and receive status information for a mobile terminal 650 from the MSC/HLR/VLR 630 via the Gateway MSC 610. FIG. 2 is a high level flow chart of the steps performed by the data service node 500 in response to a request for a page of data.

The memory 525 contains further HTTP software which enables the data service node 500 to send a page of data containing the mobile terminal status information to the requesting workstation 100 via the Internet 300. The page of data includes command icons which an operator of the workstation 100 may select to originate a voice call to the mobile terminal 650 or to send a short message to the mobile terminal 650.

Figure 3:
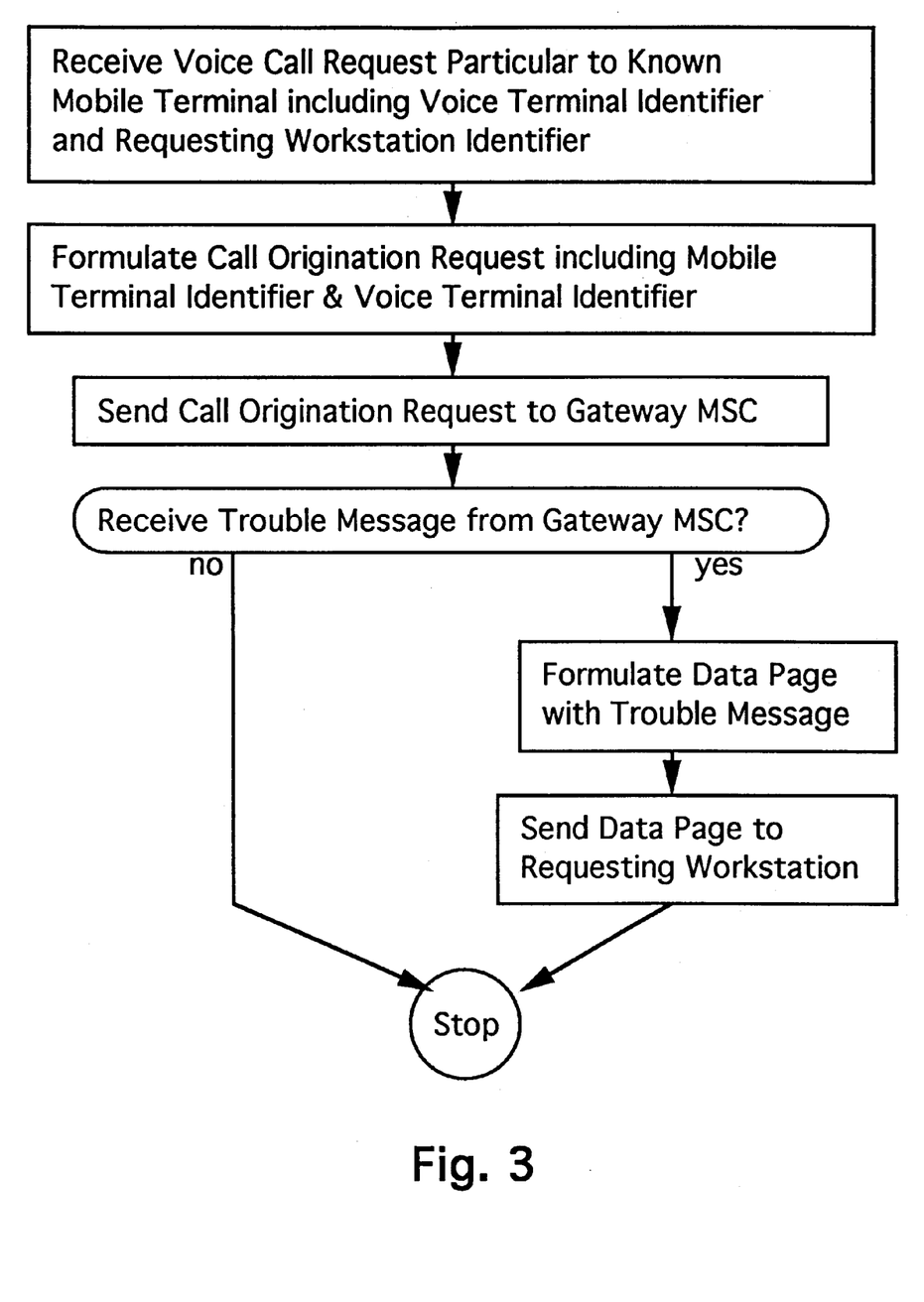
FIG. 3 is a flow chart showing steps executed by the data service node in response to a voice call request.

The voice call request icon incorporates a data entry field and text instructing the operator of the workstation 100 to enter in the data entry field the directory number of the voice terminal (for example telephone 110) on which the operator wishes to make a voice call, and then to select the voice call request icon in order to request a voice call. The memory 525 contains further HTTP software which enables the data service node 500 to receive messages corresponding to voice call request commands from the workstation 100, and a call processing software application which is executed by the data service node 500 on receipt of messages corresponding to voice call request commands. The call processing software application formulates voice call origination requests for transmission to the Gateway MSC 610 via the Gateway interface 540. FIG. 3 is a high level flow chart of the steps performed by the data service node 500 in response to a voice call request. Further details of the voice call completion procedure can be found in U.S. patent application Ser. No. 08/652,659 filed May 28, 1996 in the names of Cecil Bannister et al and entitled Methods and Apparatus for Originating Voice Calls, the full text of which is hereby incorporated by reference.

Figure 4:
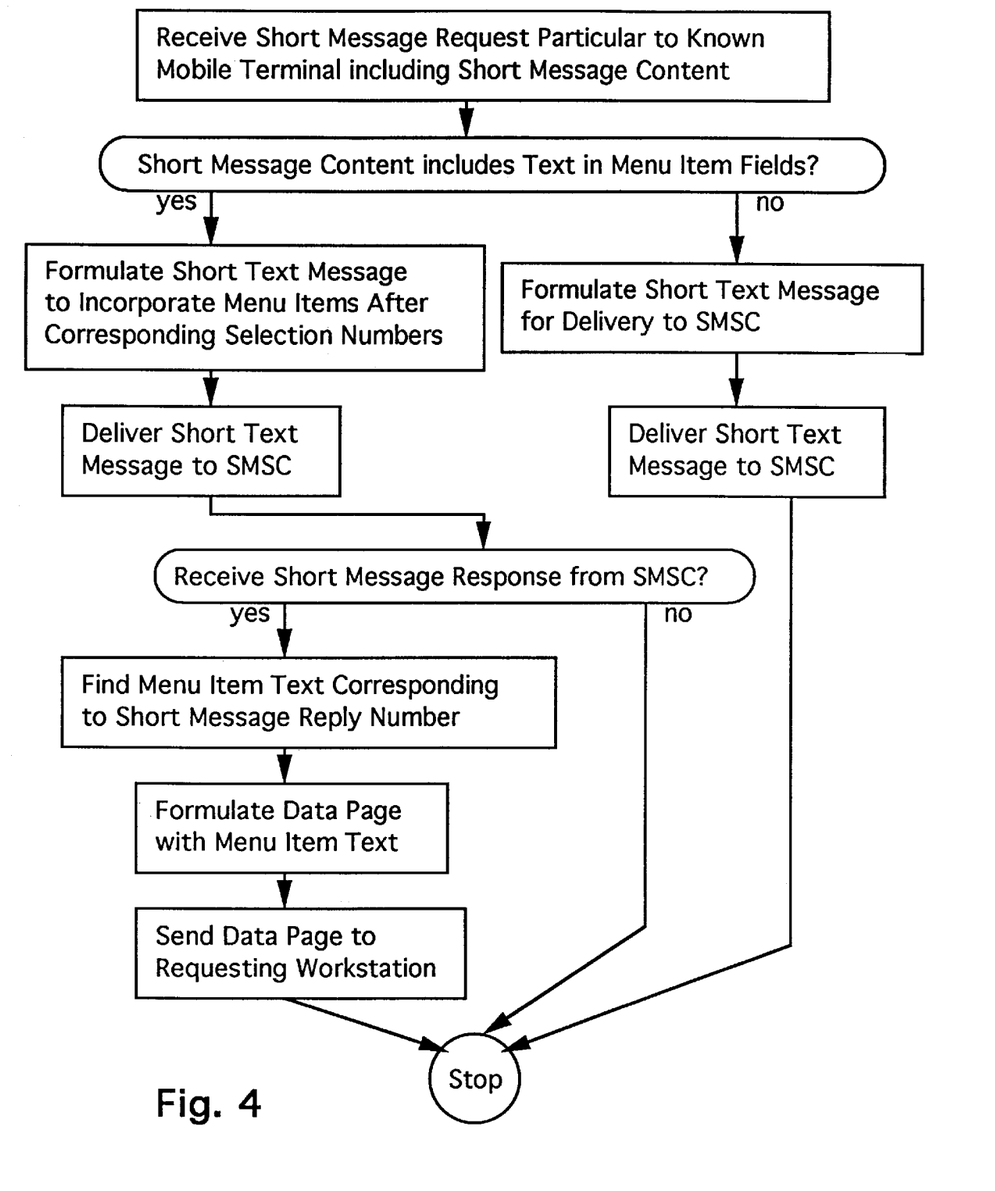
FIG. 4 is a flow chart showing steps executed by the data service node in response to a short message request.

The short message request icon incorporates a short message data entry field, 2 to 10 numbered menu item data entry fields, and text instructing the operator of the workstation 100 to enter the short message in the short message data entry field, as many short message reply options as are desired in the numbered menu item data entry fields, and then to select the short message request icon in order to send a short message to the mobile terminal 650. The memory 525 contains further HTTP software which enables the data service node to receive messages corresponding to short message request commands from the workstation 100, and a short message processing software application which is executed by the data service node on receipt of messages corresponding to short message requests. The short message processing software application formulates short message requests for transmission to the SMSC 620 via the SMSC interface 530 and receives short message replies from the SMSC 620. Further HTTP software stored in the memory 525 enables the data service node 500 to forward short message replies to the workstation 100 for display. FIG. 4 is a high level flow chart of the steps performed by the data service node 500 in response to a short message request.

Figure 5:
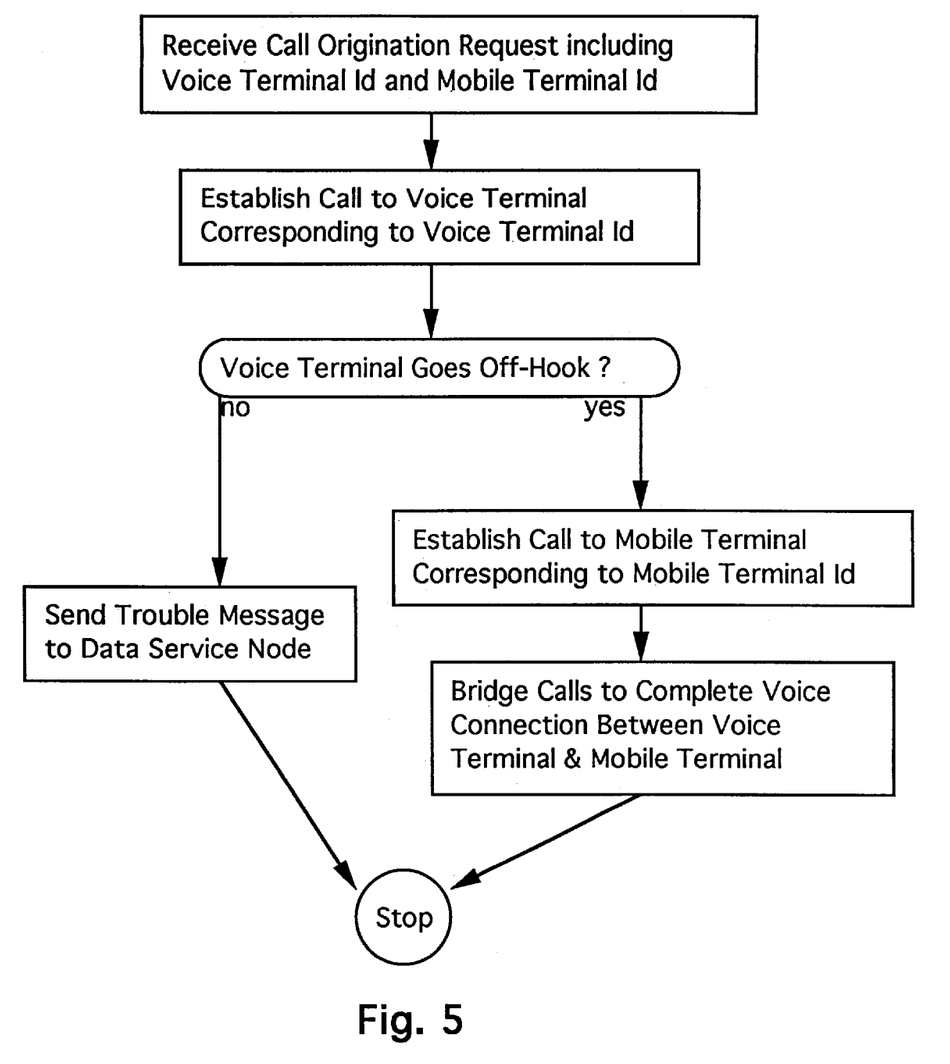
FIG. 5 is a flow chart showing steps executed by a Gateway MSC of the interconnected networks of FIG. 1 in response to a call origination request.

The Gateway MSC 610 incorporates a software application which enables it to receive mobile terminal status requests from the data service node 500 and to forward the received mobile terminal status requests to the MSC/HLR/VLR 630. This software application also enables the Gateway MSC 610 to receive mobile terminal status information from the MSC/HLR/VLR 630 and to forward the received mobile terminal status information to the data service node 500. The Gateway MSC 610 has a further software application which enables it to respond to voice call origination requests received from data service node by making requested voice connections (as will be described in more detail below). FIG. 5 is a high level flow chart of the steps performed by the Gateway MSC 610 in response to a call origination request.

The SMSC 620 incorporates a software application which enables it to receive a short message request from the data service node 500 and to translate and deliver the short message to a mobile terminal 650 specified in the short message request via the MSC/HLR/VLR 630. The software application also enables the SMSC 620 to receive a short message response from the MSC/HLR/VLR 630 and to deliver the short message response to the data service node 500.

Figure 6:
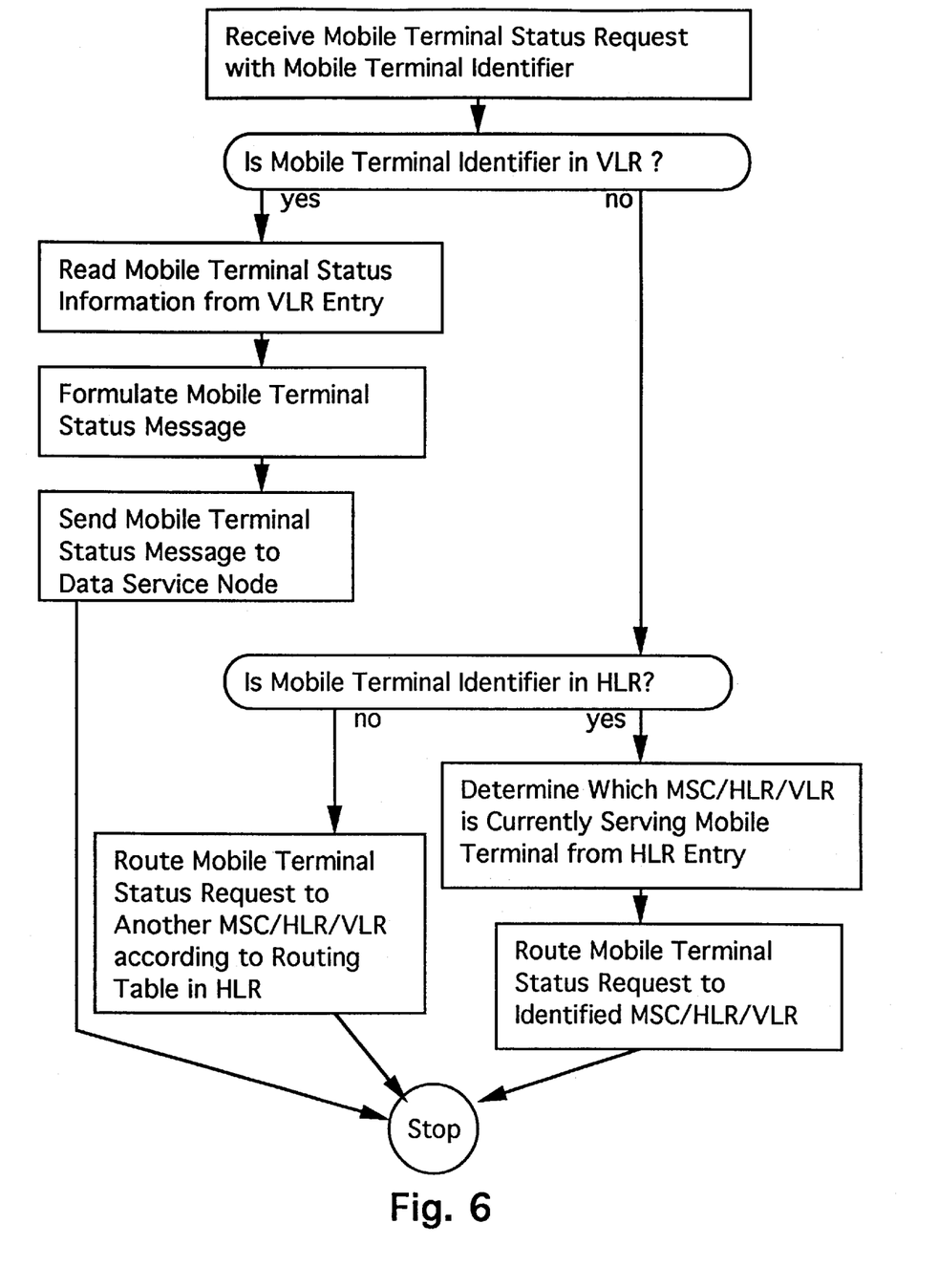
FIG. 6 is a flow chart showing steps executed by a MSC/HLR/VLR of the interconnected networks of FIG. 1 in response to a mobile terminal status request.

The MSC/HLR/VLR 630 maintains a database containing information on the current status of mobile terminals and a software application which enables it to respond to mobile terminal status requests received via the Gateway MSC 610 by sending requested mobile terminal status information to the data service node 500 via the Gateway MSC 610. (In a GSM system 600 containing more than one MSC/HLR/VLR, each MSC/HLR/VLR maintains a HLR which stores for each mobile terminal assigned to that MSC/HLR/VLR the identity of the MSC/HLR/VLR currently serving that mobile terminal. Each MSC/HLR/VLR also maintains a VLR which stores for each mobile terminal it is currently serving an indication of the current status of that mobile terminal. A mobile terminal status information request is routed from the Gateway MSC to the MSC/HLR/VLR to which the mobile terminal specified in the request is assigned. A software application running on that MSC/HLR/VLR reads the identity of the MSC/HLR/VLR currently serving the mobile terminal from the HLR and routes the mobile terminal status information request to that MSC/HLR/VLR. A software application running on the MSC/HLR/VLR which is currently serving the mobile terminal reads the current status of the mobile terminal from its VLR and transmits the status information to the data service node 500.) FIG. 6 is a high level flow chart of the steps performed by the MSC/HLR/VLR 630 in response to a mobile terminal status request.

Figure 7:
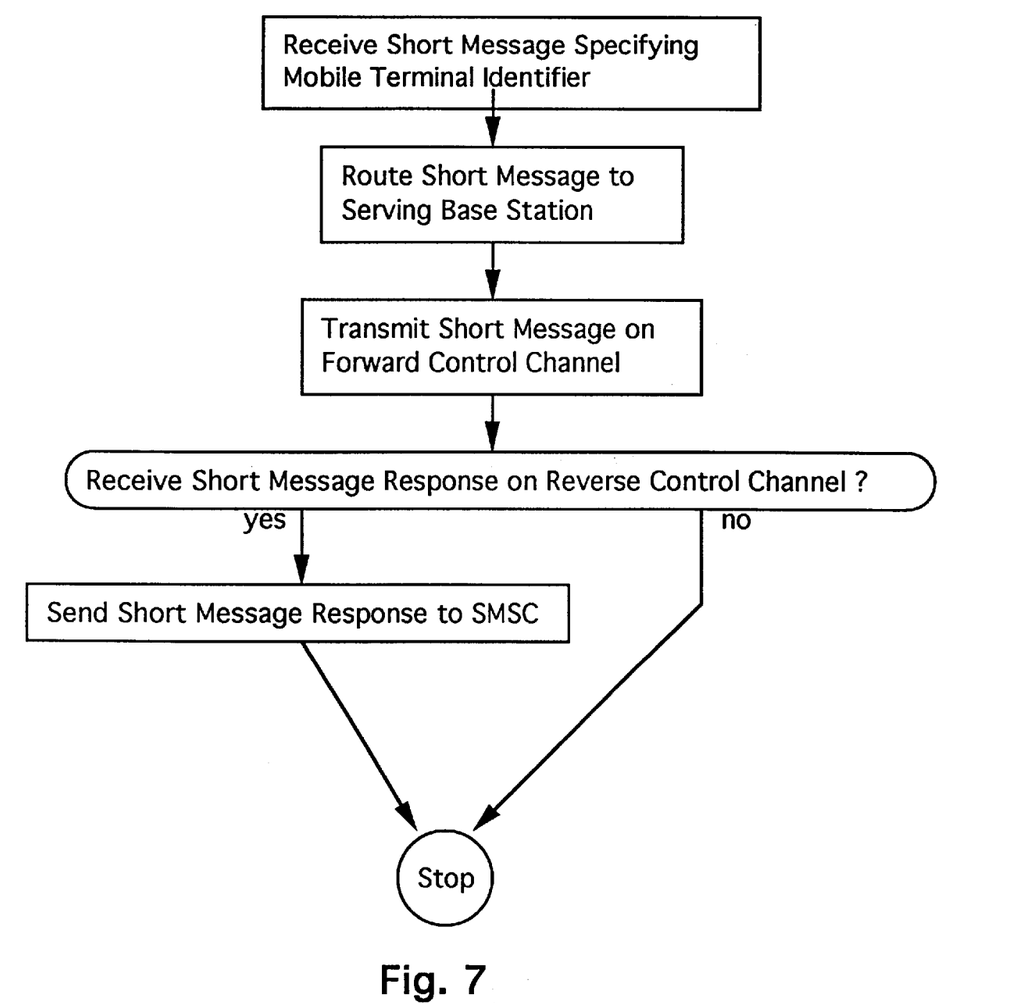
FIG. 7 is a flow chart showing steps executed by the MSC/HLR/VLR in response to a short message received from a SMSC of the interconnected networks of FIG. 1.

The MSC/HLR/VLR 630 also incorporates software applications as are required to route voice calls and short messages in the GSM system. The short message delivery application software routes a short message addressed to a particular mobile terminal 650 to the base station 640 serving that mobile terminal 650 causes the base station 640 to transmit the short message over a forward control channel for display at the mobile terminal 650. The mobile terminal 650 can transmit a short message response in the form of a single dialled digit to the base station via a reverse control channel. If a short message response is received on the reverse control channel, the short message delivery application of the MSC/HLR/VLR 630 forwards the short message response to the SMSC 620. FIG. 7 is a high level flow chart of the steps performed by the MSC/HLR/VLR 630 in response to receipt of a short message.

Figure 8:
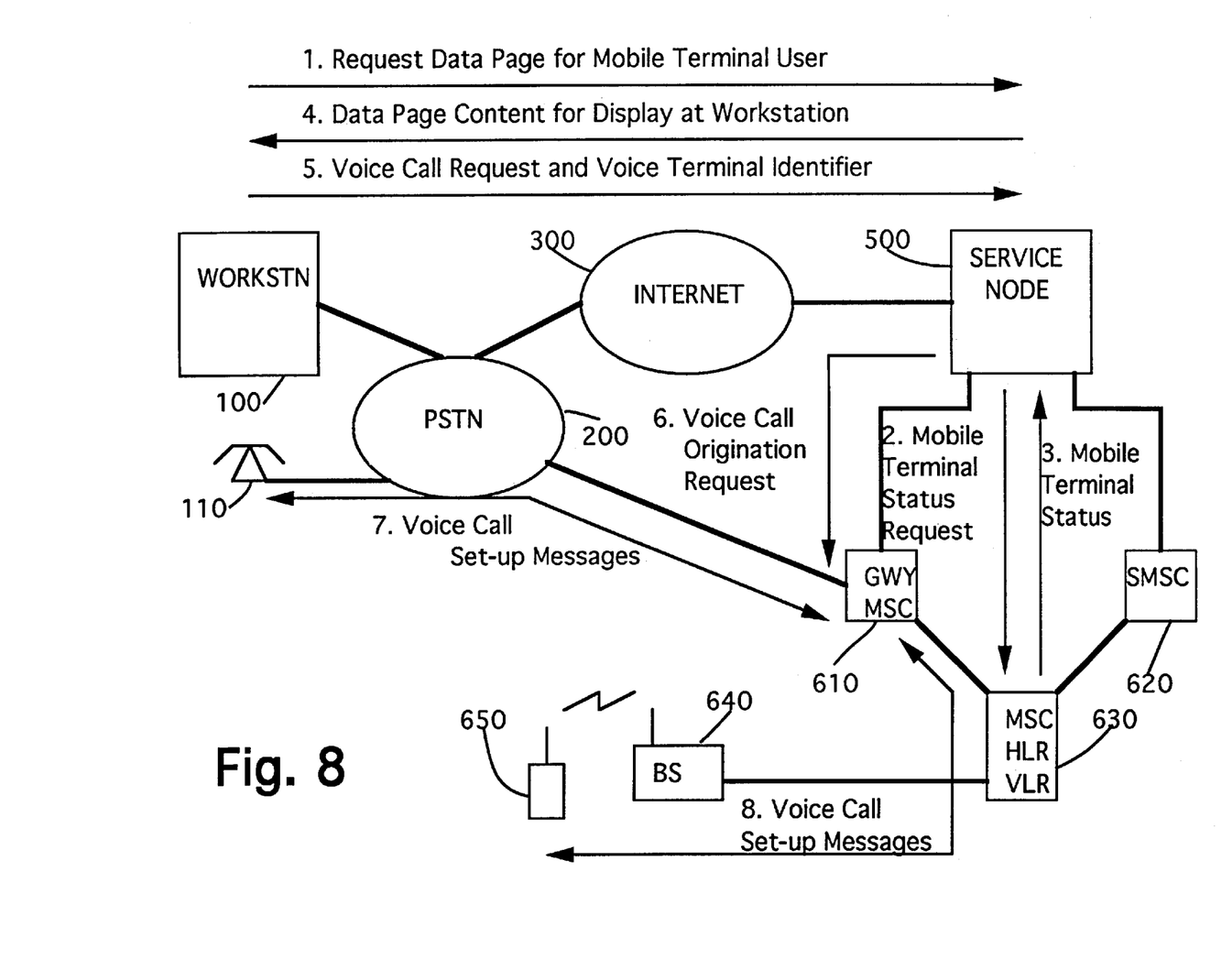
FIG. 8 is a message flow diagram showing message flows used according to the embodiment of the invention to originate a voice call to a mobile terminal.

In one application of the interconnected networks shown in FIG. 1 and described above, the operator of workstation 100 uses the interconnected networks to obtain a voice connection between a telephone 110 and a mobile terminal 650. Message flows required to effect the voice connection are shown in FIG. 8.

The operator connects the workstation 100 to the Internet 300 via the PSTN 200 using conventional Internet access procedures. Using the browser software stored in the workstation 100, the operator uses conventional procedures to request display of a World Wide Web page of data giving status information for the mobile terminal 650. The operator may have stored the Uniform Resource Locator (URL) address of this page of data as a "bookmark" at the workstation 100.

The Internet 300 forwards the request to the data service node 500. The data service node 500 responds to the request by transmitting a mobile terminal request status request specifying the mobile terminal 650 to the MSC/HLR/VLR 630 via the Gateway MSC 610. The MSC/HLR/VLR 630 responds by transmitting the requested mobile terminal status information to the data service node 500, which formulates a page of data containing the status information and forwards that page of data to the workstation 100. The forwarded page of data indicates that the mobile terminal 650 is registered but idle, and incorporates a voice call request icon with an associated data entry field.

The operator enters the directory number of his telephone 110 in the data entry field and selects the voice call request icon. The workstation 100 executes HTML instructions received with the page of data to formulate a voice call request including the directory number, and to transmit the voice call request and the directory number to the data service node 500. The data service node 500 formulates a voice call origination request including the directory number of the telephone 110 and the directory number of the mobile terminal 650, and forwards the origination request to the Gateway MSC 610.

The Gateway MSC 610 responds to the origination request by first using conventional voice call set-up messages to establish a voice channel from the Gateway MSC 610 to the telephone 110. When the telephone 110 goes off-hook, the Gateway MSC 610 uses conventional GSM voice call set-up messages to establish a voice channel from the Gateway MSC 610 to the mobile terminal 650 via the MSC/HLR/VLR 630. When the voice call is answered at the mobile terminal 650, the Gateway MSC 610 connects the voice channels to provide a voice path between the telephone 110 and the mobile terminal 650.

Figure 9:
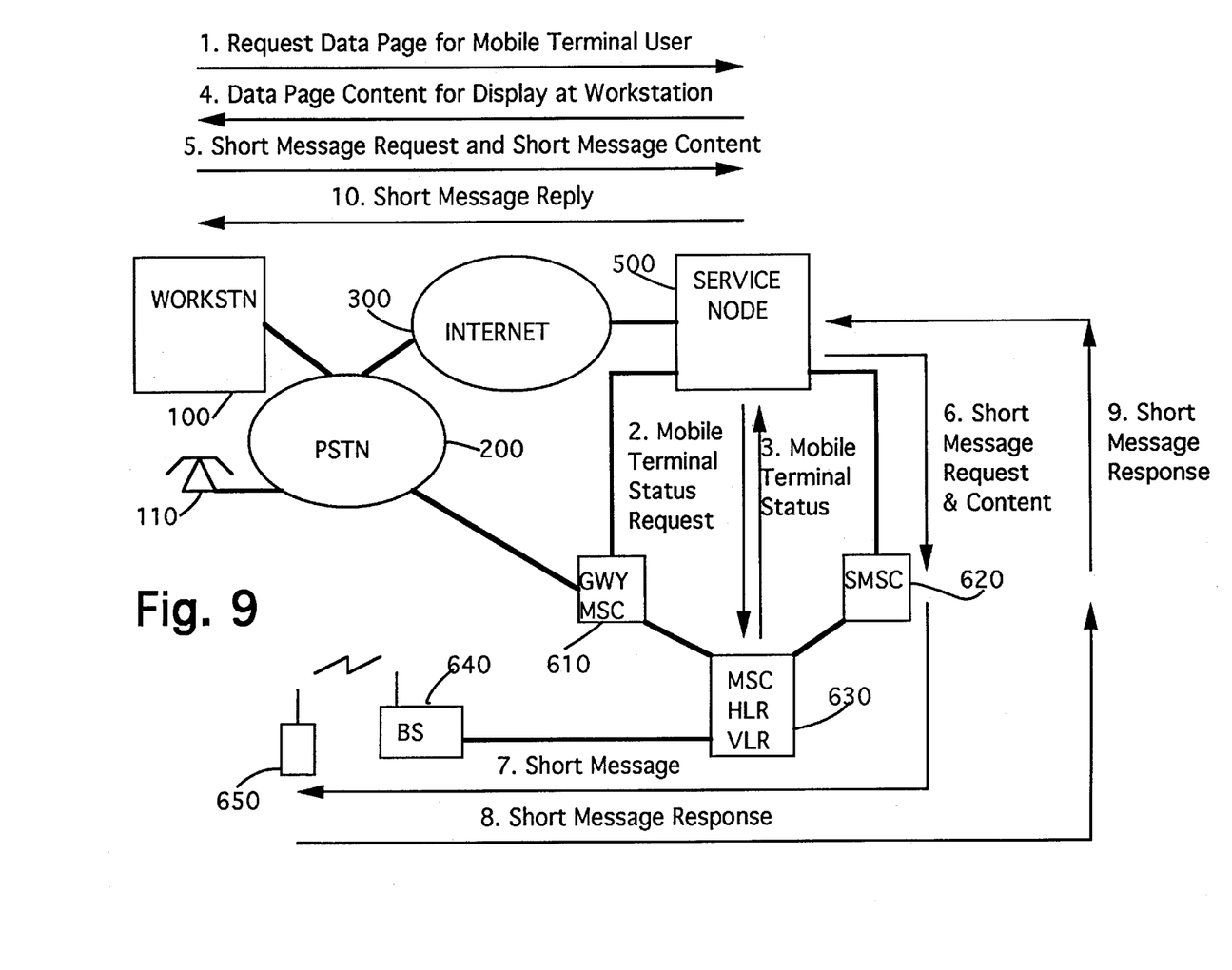
FIG. 9 is a message flow diagram showing message flows used according to the embodiment of the invention to exchange short messages with a mobile terminal.

In another application of the interconnected networks shown in FIG. 1, the operator of workstation 100 uses the interconnected networks to send a short message to a mobile terminal 650 and to receive a short message response from the mobile telephone 650. Message flows required to effect the short message exchange are shown in FIG. 9.

The operator connects the workstation 100 to the Internet 300 via the PSTN 200 using conventional Internet access procedures. Using the browser software stored in the workstation 100, the operator uses conventional procedures to request display of a World Wide Web page of data giving status information for the mobile terminal 650. The operator may have stored the Uniform Resource Locator (URL) address of this page of data as a "bookmark" at the workstation 100.

The Internet 300 forwards the request to the data service node 500. The data service node 500 responds to the request by transmitting a mobile terminal request. status request specifying the mobile terminal 650 to the MSC/HLR/VLR 630 via the Gateway MSC 610. The MSC/HLR/VLR 630 responds by transmitting the requested mobile terminal status information to the data service node 500, which formulates a page of data containing the status information and forwards that page of data to the workstation 100. The forwarded page of data indicates that the mobile terminal 650 is registered and either idle or busy, and incorporates a short message request icon with an associated short message data entry field and ten numbered menu item data entry fields.

Because the mobile terminal 650 is busy, or because the operator of the work station 100 prefers to send a short message, the operator enters a short message in the short message data entry field, for example "Flight at 6:30 is cancelled. Should I book:".

The operator proceeds to enter "7:00?" in the first menu item data entry field, "8:00?" in the second menu item data entry field and "I'll book it myself" in the third menu item field, leaving the remaining menu item data entry fields blank. The operator then selects the short message request icon, and the workstation 100 executes HTML instructions received with the page of data to formulate a short message request including the short message content, and to transmit the short message request and the short message content to the data service node 500. The data service node 500 formulates a short message request including the short message content, and forwards the short message request to the SMSC 620.

The SMSC 620 delivers the short message to the mobile terminal 620 via the MSC/HLR/VLR 630 which transmits the short message via a forward control channel between the base station 640 and the mobile terminal 650.

The mobile terminal 650 sounds an alerter and displays the received short message and numbered menu items:

"Flight at 6:30 is cancelled. Should I book:

1. 7:00?

2. 8:00?

3. I'll book it myself"

The operator of the mobile terminal 650 reads the displayed message, decides to book his flight himself, and executes keystrokes required to send a short message consisting essentially of the digit "3" on the keypad of the mobile terminal 650. (The particular keystrokes required will depend on the type of the mobile terminal 650 and the manner in which short message functions have been programmed on that mobile terminal 650.) A short message response comprising the numeral "3" is transmitted on a reverse control channel to the MSC/HLR/VLR 630 and forwarded to the data service node 500 via the SMSC 620. The data service node 500 formulates a new page of data displaying the selected menu item as a short message response, and forwards the new page of data via the Internet 300 to the workstation 100 for display.

The systems and methods described above offer several advantages over conventional systems and methods for communicating with mobile terminals. In particular, the caller is able to determine the status of the mobile terminal before placing a call to the terminal. Consequently, the caller can decide whether to place a voice call to the mobile terminal or to send a short message to the mobile terminal based on the current status of the mobile terminal.

The caller does not need any special software applications running on his workstation in order to obtain the status information and send the short message, apart from browser software applications (e.g. Netscape™) which is readily available and already installed on many workstations. Moreover, the caller can use the "bookmark" capability of such browser software applications to file the URLs of frequently called terminals under names meaningful to him so that they can be recovered for use more quickly and easily than directory numbers. Furthermore, the short message composition interface is simple, reliable, flexible and private, especially when compared to more conventional short message composition interfaces.

The user-defined menu items incorporated in the short messages that can be composed using the short message composition interface permit meaningful short message replies with minimal use of reverse radio channels, minimal consumption of wireless system resources and minimal enhancements to the wireless system and the mobile terminal.

The embodiments described above may be modified without departing from the principles of the invention. For example, voice calls can be requested, short messages can be sent and short message replies can be received at the workstation 400 having a different arrangement for connection to the Internet 300.

The workstations 100, 400 can be configured to execute Java or Java Script instructions received from the data service node rather than HTML instructions.

Moreover, the functionality of either or both of the Gateway MSC 610 and the SMSC 620 can be integrated into the data service node 500. The call completion application, described above as running on the Gateway MSC 610, could run on the data service node 500 or on another server connected to the Gateway MSC 610 rather than on the Gateway MSC 610. The MSC/HLR/VLR 630 can be distributed over a network of interconnected processors.

The illustrated embodiment uses and extends the short message capability of a GSM wireless system 610, but could also be applied to the short message capabilities of other wireless systems.

In one extension of the embodiment described above, the memory 525 of the data service node 500 stores predefined replies, each predefined reply being associated with a corresponding character string. For example, predefined messages could be associated with two or three digits corresponding to the first two or three letters in the predefined message, the correspondence of digits to letters being determined according to the letters and digits displayed on a standard telephone keypad or dial. Thus for instance:

1. the predefined message "Busy now, call you back later" could be stored in association with the digits 287 corresponding to the letters BUS;
2. the predefined message "Yes" could be stored in association with the digits 937 corresponding to the letters YES; and
3. the predefined message "No" could be stored in association with the digits 66 corresponding to the letter NO.

In the operation of this embodiment, when the data service node 500 receives a short message response from the wireless communications system 600, it determines whether that short message response contains a single digit code corresponding to a reply predefined in the short message sent by the caller. If the short message response contains such a single digit code, the data service node sends that single digit code (and optionally sends the text corresponding to that single digit code) in a page of data returned to the data terminal 100. If the short message response contains a multidigit code corresponding to a predefined message stored in the memory 525, the data service node 500 sends the text of that message in a page of data returned to the data terminal 100. Optionally, if the short message response contains a character string which is neither a single digit code nor a multidigit code corresponding to a predefined message, the data service node 500 may return a page of data containing that character string to the data terminal 100. This would enable the user of the called mobile terminal 650 to compose a custom reply, provided that the mobile terminal 650 has alphanumeric entry capability.

Predefined short message replies could also be stored in the wireless communications network 600, at the mobile terminal 650, in the SMSC 620, or at a server connected to the SMSC 620. In that case, execution of keystrokes corresponding to a predefined reply at the mobile terminal 650 would result in a short message response containing the text of the predefined reply being included as a character string in the short message response sent from the SMSC 620 to the data service node 500, and the data service node 500 would include that character string in a page of data returned to the data terminal 100. Storage of predefined messages in the wireless communications network 600 could be instead of, or in addition to storage of predefined messages in the data service node 500.

The predefined short message replies could be made user-dependent by storing sets of predefined replies at the data service node 500, each set of predefined replies being associated with a respective user identifier, and each predefined reply being associated with a respective character string. Short message responses from the wireless communications system would include the user identifier (for example the identifier of the mobile terminal 650) and a character string identifying the predefined reply selected at the mobile terminal 650. The data service node 500 would send a page of data to the data terminal 100, the page of data including the text of the selected predefined reply. When the character string in the short message response does not correspond to any of the predefined replies of the set of predefined replies associated with the user identifier, the data service node 100 would sends a page of data comprising the character string received from the wireless communications system, on the understanding that this is likely to be a custom reply composed at the mobile terminal 650 or a predefined reply forwarded from the wireless communications system 600.

In another extension of the embodiment described above, the short message request icon could include a button for requesting notification of delivery. In this case, the data service node 500 would include a software application which reads and translates messages returned from the SMSC 620, and forwards the translated messages to the workstation 100 as part of a data page, so that the user of the workstation 100 can monitor the progress of delivery of the short message to the mobile terminal 650.

These and other modifications of the described embodiments are encompassed by the claims below.

I claim:

1. A method for providing communications to a telecommuncations terminal, the method comprising:

receiving a request for a page of data from a data terminal connected to a data network at a data service node of the data network, the request specifying at least one particular telecommunications terminal;

sending a terminal status request from the data service node to a communications system which serves the particular telecommunications terminal, the terminal status request specifying the particular telecommunications terminal;

receiving from the communications system at the data service node a terminal status message containing information indicating a current status of the particular telecommunications terminal;

sending from the data service node to the data terminal a page of data indicating the current status of the particular telecommunications terminal, the page of data comprising at least one icon when the particular telecommunications terminal is in a state in which it can receive communications;

upon selection of the icon, receiving at the data service node a communications request specifying the particular telecommunications terminal and another telecommunications terminal, and sending from the data service node to the communications system a communications origination request to originate communications between the particular telecommunications terminal and the other telecommunications terminal.

2. A method as defined in claim 1, wherein:

the particular telecommunications terminal is a mobile voice terminal having a display for displaying alphanumeric information;

the communications system is a wireless communications system;

the page of data comprises a voice call request icon when the particular telecommunications terminal is in a state in which it can receive a voice call;

the page of data comprises a short message request icon, the short message request icon comprising a data entry field for entry of a text message;

upon selection of the voice call request icon at the data terminal, the data service node receives a voice call request comprising a voice terminal identifier and sends from the data service node to the communications system a voice call origination request to originate a voice call between a voice terminal specified by the voice terminal identifier and the particular telecommunications terminal; and upon selection of the short message request icon at the data terminal, the data service node receives a short message request comprising a short message and sends from the data service node to the communications system a short text message for delivery to and display at the particular telecommunications terminal.

3. A method as defined in claim 2, wherein:

the short message request icon further comprises a plurality of numbered menu item data entry fields for entry of short message reply alternatives;

the short message request further comprises any text entered into the numbered menu item data entry fields;

the data service node sends to the communications system any text entered in the numbered menu item data entry fields for display at the particular telecommunications terminal as numbered menu items;

the data service node receives from the communications system a short message response comprising a dialled digit corresponding to one of the numbered menu items; and the data service node sends another page of data to the data terminal, the other page of data specifying the numbered menu item corresponding to the dialled digit.

4. A method as defined in claim 2, wherein:

the data service node stores predefined replies, each predefined reply being associated with a respective character string;

the data service node receives from the communications system a short message response comprising a character string associated with a selected one of the predefined replies; and the data service node sends another page of data to the data terminal, the other page of data comprising text corresponding to the selected predefined reply.

5. A method as defined in claim 4, wherein:

the data service node stores sets of predefined replies, each set of predefined replies being associated with a respective user identifier and each predefined reply being associated with a respective character string;

the data service node receives from the communications system a short message response comprising a user identifier and a character string associated with a selected one of the predefined replies in the set of predefined replies associated with the received user identifier; and the data service node sends another page of data to the data terminal, the other page of data comprising text corresponding to the selected predefined reply.

6. A method as defined in claim 2, wherein:

the communications system stores predefined replies;

the data service node receives from the wireless communications system a short message response comprising text of a selected predefined reply; and the data service node sends another page of data to the data terminal, the other page of data comprising the text of the selected predefined reply.

7. A method as defined in claim 2, wherein:

the data service node receives from the communications system a short message response comprising text; and the data service node sends another page of data to the data terminal, the other page of data comprising the text received from the communications system.

8. A method as defined in claim 2, wherein:

the data service node stores predefined replies, each predefined reply being associated with a respective character string;

the data service node receives from the communications system a short message response comprising a character string;

when the character string corresponds to a selected predefined reply, the data service node sends another page of data to the data terminal, the other page of data comprising text of the selected predefined reply; and when the character string does not correspond to any of the predefined replies, the data service node sends another page of data to the data terminal, the other page of data comprising the character string received from the wireless communications system.

9. A method as defined in claim 8, wherein:

the data service node stores sets of predefined replies, each set of predefined replies being associated with a respective user identifier and each predefined reply being associated with a respective character string;

the data service node receives from the communications system a short message response comprising a user identifier and a character string;

when the character string corresponds to a selected predefined reply of the set of predefined replies associated with the user identifier, the data service node sends another page of data to the data terminal, the other page of data comprising text of the selected predefined reply; and when the character string does not correspond to any of the predefined replies of the set of predefined replies associated with the user identifier, the data service node sends another page of data to the data terminal, the other page of data comprising the character string received from the wireless communications system.

10. A method as defined in claim 2, wherein the voice call request icon and the short message request icon are respective selectable lines of text.

11. A data service node for providing communications to a telecommunications terminal, the data service node comprising a processor and a memory storing instructions for execution by the processor and being connected to a data network, the data service node being operable according to the instructions:

to receive a request for a page of data from a data terminal connected to a data network, the request specifying at least one particular telecommunications terminal;

to send a terminal status request to a communications system which serves the telecommunications terminal, the mobile terminal status request specifying the particular telecommuncations terminal;

to receive from the communications system a terminal status message containing information indicating a current status of the particular telecommunications terminal;

to send to the data terminal a page of data indicating the current status of the particular telecommuncations terminal, the page of data comprising at least one communications request icon when the particular telecommunications terminal is in a state in which it can receive communications; and upon selection of the voice call request icon at the data terminal, to receive a communications request specifying another telecommunications terminal, and to send to the communications system a communications origination request to originate communications between the particular telecommunications terminal and the other telecommunications terminal.

12. A data service node as defined in claim 11, wherein:

the page of data comprises a voice call request icon when the particular telecommunications terminal is a mobile voice terminal which is in a state in which it can receive a voice call;

the page of data comprises a short message request icon when the particular telecommunications terminal is a mobile voice terminal having a display, the short message request icon comprising a data entry field for entry of a text message;

upon selection of the voice call request icon at the data terminal, the data service node receives a voice call request comprising a voice terminal identifier and to the communications system a voice call origination request to originate a voice call between a voice terminal specified by the voice terminal identifier and the particular telecommunications terminal; and upon selection of the short message request icon at the data terminal, the data service node receives a short message request comprising a short message and sends a short text message for delivery to and display at the particular telecommunications terminal.

13. A data service node as defined in claim 12, wherein:

the short message request icon further comprises a plurality of numbered menu item data entry fields for entry of short message reply alternatives;

the short message request further comprises any text entered into the numbered menu item data entry fields;

the data service node is operable according to the instructions stored in the memory to send to the communications system any text entered in the numbered menu item data entry fields for display at the particular telecommunications terminal as numbered menu items;

the data service node is operable according to the instructions stored in the memory to receive from the communications system a short message reply comprising a dialled digit corresponding to one of the numbered menu items; and the data service node is operable according to the instructions stored in the memory to send another page of data to the data terminal, the other page of data specifying the numbered menu item corresponding to the dialled digit.

14. A data service node as defined in claim 12, further comprising a memory for storing predefined responses, each predefined response being associated with a character string, the data service node being operable to receive from the communications system a short message response comprising a character string corresponding to a selected one of the predefined responses and to send another page of data to the data terminal, the other page of data comprising text corresponding to the selected predefined response.

15. A data service node as defined in claim 12, operable to receive from the communications system a short message response comprising text, and to send another page of data to the data terminal, the other page of data comprising the received text.

16. A data service node as defined in claim 12, further comprising a memory for storing predefined replies, each predefined reply being associated with a respective character string, the data service node being operable to receive from the communications system short message responses comprising character strings and:

when a received character string corresponds to a selected predefined reply, to send another page of data to the data terminal, the other page of data comprising text of the selected predefined reply;

when a received character string does not correspond to any of the character strings associated with the predefined replies, to send another page of data to the data terminal, the other page of data comprising the character string received from the communications system.

17. A data service node as defined in claim 16, wherein:

the data service node is operable to store sets of predefined replies, each set of predefined replies being associated with a respective user identifier and each predefined reply being associated with a respective character string;

the data service node is operable to receive from the communications system a short message response comprising a user identifier and a character string;

when a received character string corresponds to a selected predefined reply of the set of predefined replies associated with the user identifier, the data service node is operable to send another page of data to the data terminal, the other page of data comprising text of the selected predefined reply; and when a received character string does not correspond to any of the predefined replies of the set of predefined replies associated with the user identifier, the data service node is operable to send another page of data to the data terminal, the other page of data comprising the character string received from the communications system.

18. A data service node as defined in claim 12, operable to send pages of data to data terminals, the pages comprising voice call request icons and short message request icons, the voice call request icons and the short message request icons being respective selectable lines of text.

* * * * *